United States Patent [19]

Kietzman

[11] 4,186,123
[45] Jan. 29, 1980

[54] FILLED POLYMERIC COMPOSITION

[75] Inventor: John H. Kietzman, Golden, Colo.

[73] Assignee: Johns-Manville Corporation, Denver, Colo.

[21] Appl. No.: 638,249

[22] Filed: Dec. 8, 1975

Related U.S. Application Data

[63] Continuation-in-part of Ser. No. 511,342, Oct. 2, 1974, abandoned, and a continuation-in-part of Ser. No. 618,713, Oct. 1, 1975, abandoned.

[51] Int. Cl.² .................. C08K 3/10; C08K 3/18; C08K 3/34; C08K 5/05
[52] U.S. Cl. .................. 260/37 SB; 106/308 Q; 260/37 EP; 260/37 N; 260/38; 260/42.14; 260/42.44; 260/42.45; 260/42.49; 260/42.52; 428/271; 427/220
[58] Field of Search .............. 106/308 Q; 260/42.14, 260/42.44, 42.45, 42.47, 42.49, 42.52, 37 SB, 37 EP, 37 N, 38; 428/271; 447/220

[56] References Cited

U.S. PATENT DOCUMENTS

| | | | |
|---|---|---|---|
| 3,180,848 | 4/1965 | Thompson | 260/42.44 |
| 3,451,835 | 6/1969 | Ganter et al. | 106/308 Q |
| 3,936,417 | 2/1976 | Ronden | 260/42.44 |

FOREIGN PATENT DOCUMENTS 896067  5/1962  United Kingdom.

OTHER PUBLICATIONS

Ewchuk, The Society of the Plastics Industry, Inc., 28th Ann. Tech. Conf., 1973 (sect.-3D, pp. 1-14).
Speri et al., ACS Preprint, Div. of Org. Coatings & Plastics Chem., vol. 33, No. 2, pp. 152-163, Aug. 1973.

*Primary Examiner*—Allan Lieberman
*Attorney, Agent, or Firm*—Robert M. Krone; Joseph J. Kelly; James W. McClain

[57] ABSTRACT

A composition is described comprising a resin matrix reinforced with nonamphibole asbestos fiber or other inorganic fibers having similar aspect ratios, fiber diameters and hydrophilic surfaces, in a concentration of 5 to 85 phr, the fiber being coated with a glycol in a concentration of 3 to 75% by weight of fiber. The glycol will have the following properties:
(a) liquid and stable up to and at the processing temperature of the resin;
(b) liquid at temperatures of less than 50° C. (122° F.);
(c) chemically unreactive with the resin;
(d) low hygroscopicity; and
(e) generally immiscible with the resin at ambient temperatures.

Preferably the glycol will be ethylene glycol, propolyene glycol or a polyethylene glycol having a molecular weight not greater than 1500. An internal lubricant may also be used in the composition. Both thermosetting and thermoplastic resins may be used; good results have been obtained with polyvinyl, polyolefin and phenolic resins. The invention comprises the composition itself, the process for its formation, the coated asbestos fiber used for reinforcing the composition and shaped articles, such as pipe, made from the composition.

30 Claims, 1 Drawing Figure

PVC COMPOUNDING AT 200°C

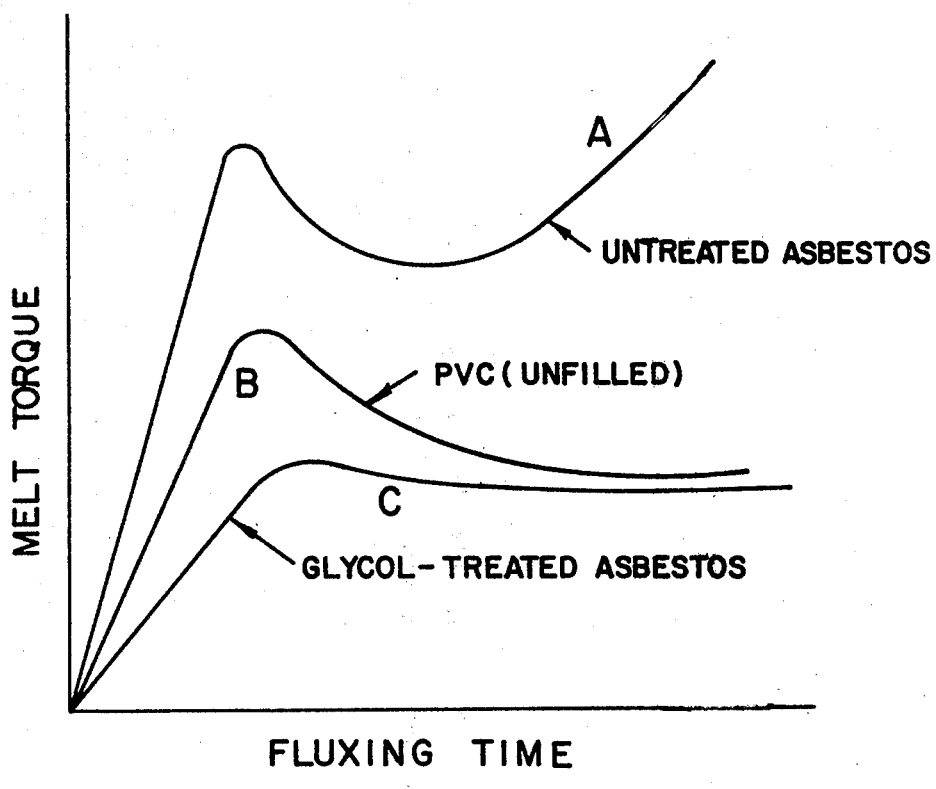

FILLED POLYMERIC COMPOSITION

CROSS-REFERENCE TO RELATED APPLICATIONS

This application is a continuation-in-part of application Ser. No. 511,342, filed Oct. 2, 1974, and also a continuation-in-part of application Ser. No. 618,713, filed Oct. 1, 1975, both now abandoned.

BACKGROUND OF THE INVENTION

1. Field of the Invention

The invention herein relates to filled polymeric materials. More particularly it relates to such materials filled with specially treated asbestos fiber. It also relates to that specially treated asbestos fiber itself.

Asbestos has long been known as a reinforcing filler or extender for various polymeric resins. Use of fillers is often desirable in order to reduce the amount of resin necessary to manufacture specific products, such as pipe. During periods when resins are in short supply, use of fillers permits more effective use of the available resin. Certain fillers can also improve the flexural and tensile strengths of the resin as well as its creep resistance.

Use of asbestos fiber as a reinforcing filler or extender in thermoplastics has been limited, however, by the fact that asbestos fiber generally has a detrimental effect on the ductility and impact strength of the molded resins. Consequently, asbestos fiber has not been considered satisfactory as a filler for such resinous materials as plastic pipe, where impact resistance is critical.

In addition to the problems of ductility and impact strength reduction, the use of asbestos fibers in thermoplastic resins has also raised additional problems. It has been found quite difficult to disperse untreated fiber adequately in the thermoplastic. Poor fiber dispersion also adversely affects the appearance and reinforcing effect of the fiber in the molded resins.

In addition, uncoated high-surface-area fibers such as asbestos fibers require a considerable amount of energy input to a resin system to properly coat the fibers with the thermoplastic resin matrix. Since many thermoplastic resins (including polyvinyl chloride: "PVC") are shear sensitive, the high energy shearing necessary to properly coat the fibers often results in severe degradation of the resin matrix, unless a large concentration of stabilizer is incorporated into the resin, at a correspondingly higher cost. The shearing effect is illustrated graphically in the single figure of the drawing. Curve A in that drawing shows the amount of energy input over a period of time necessary to incorporate uncoated asbestos fiber into a PVC matrix. Not only is the initial maximum considerably higher than that required for preparation of unfilled PVC, but any extended shearing results in a marked increase in energy input with a corresponding deterioration of the matrix. The unfilled PVC of Curve B, on the other hand, reaches an initial maximum and then drops off to a stable response to continued shearing. (Further reference to this graph will be discussed below.)

2. Description of the Prior Art

Glycols have previously been used as wetting agents in liquid resin for ebonite laminates consisting of rubber polymers and asbestos papers; see the article by W. Ewchuk, The Society of the Plastics Industry, Inc., Reinforced Plastics/Composites Institute, 28th Annual Technical Conference, 1973, (Section 3-D, Pages 1–14). The purpose of the glycol was to promote penetration of the asbestos paper by the liquid polymer. The physical properties of such laminates were found to deteriorate unless the asbestos content was at least 50–70%. The glycols were also shown to improve flexural strength but the effect on impact strength over the non-glycol-containing material was not reported.

U.S. Pat. No. 1,721,675 describes a fibrous brake lining comprising asbestos fibers which is coated or saturated with glycerol, a hygroscopic triol with a low boiling point.

U.S. Pat. No. 3,180,848 describes the use of aliphatic polyhydric alcohols in asbestos reinforced vinyl halides to stabilize the resins against the degrading effect of the iron present in many types of asbestos. Specifically disclosed are those aliphatic polyhydric alcohols having from two to nine hydroxyl groups and including ethylene glycol (diol), diethylene glycol (diol), glycerol (triol), pentaerythritol (tetrol), dipentaerythritol (hexol) and sorbitol (hexol). The polyhydric alcohols are mixed into the resin formulation in amounts up to approximately 10% by weight of the asbestos fiber present. The resin, asbestos fiber and alcohol are all mentioned as separate components of a mixed system, with no suggestion or recognition of coating of the asbestos fiber prior to compounding with the resin.

A number of theoretical aspects of fiber incorporation into resins are discussed in Speri et al., "Effect of Fiber-Matrix Adhesion on the Properties of Short Fiber Reinforced ABS," American Chemical Society Preprint, Division of Organic Coatings and Plastics Chemistry, 166th Meeting, vol. 33, no. 2, pp. 152–163 (August, 1973). The fibers there described were potassium titanate fibers. The other materials present are described only as "proprietary coupling agent," "proprietary ABS lubricant" and "silicone release agent".

Stearic acid lubricants in combination with untreated chrysotile fiber in polyethylene are shown in U.S. Pat. No. 3,654,202.

OBJECTS OF THE INVENTION

It is an object of this invention to provide a plastic composition comprising a polymeric resin matrix filled with a substantial amount of treated asbestos fiber and in which the physical properties of the filled composition are comparable to or better than those of the unfilled resin.

It is also an object of this invention to provide a composition from which can be fabricated plastic articles in which treated asbestos fiber is present as reinforcement and which also have satisfactory impact strengths.

It is further an object of this invention to provide a filled resin composition in which the resin content can be significantly decreased from that of prior art compositions without substantially affecting the physical properties of the finished products.

It is further an object of this invention to provide a new asbestos fiber product which comprises asbestos fiber coated with a specifically defined type of glycol.

SUMMARY OF THE INVENTION

The invention herein is a novel composition of matter comprising a resin matrix reinforced with coated asbestos fiber, and the coated fiber itself. The fiber will be a non-amphibole asbestos fiber, or other inorganic fiber with similar aspect ratios, fiber diameters, and hydrophillic surfaces and preferably will be chrysotile asbestos fiber. The glycol must be a diol which is stable and liquid up to and at the processing temperature of the polymeric resin and which has a melting point below 50° C. (122° F.), and which is compatible but chemically unreactive and immiscible with the resin. The total composition comprises a resin matrix reinforced with the glycol coated asbestos fiber. Both thermoplastic and thermosetting resins may be used. The invention herein has been found to be highly beneficial with polyvinyl, polyolefin and phenolic resin. Other resins such as polystyrene resins are also contemplated. Most preferred are the polyolefin and polyvinyl halides, especially PVC. The coated asbestos fiber will be dispersed throughout the resin in a concentration of 5 to 85 parts by weight per 100 parts by weight of resin (hereinafter abreviated "phr"). The glycol will be present as a coating on the fiber in amounts of from 1% to 75%, preferably 3% to 25% by weight based on the asbestos fiber. The glycol substantially coats the asbestos fiber but is not chemically reacted with it.

Also within the scope of the present invention is the method of making the composition which comprises precoating the asbestos fiber with the glycol and then mixing the glycol coated fiber into the resin matrix.

Also within the scope of the present invention are various specific articles made from the composition, including extruded pipe.

The composition may also desirably contain an internal lubricant such as stearic acid or polyethylene glycol for the resin matrix. Incorporation of the lubricant depends upon the ductility of the compositon, for the lubricant is added in amounts to maintain or restore ductility lost at high fiber concentration.

BRIEF DESCRIPTION OF THE DRAWING

The single FIGURE of the drawing is a graph illustrating the reduced energy needed to incorporate the coated fiber of this invention into the resin matrix as well as the improved stability and reduced melt viscosity of PVC resin containing glycol-coated fiber.

DETAILED DESCRIPTION AND PREFERRED EMBODIMENTS

The resin matrix of the composition of this invention may be a thermosetting or a thermoplastic resin. The thermosetting resin may be phenolic, epoxy, polyester, polyurethane or silicone resin, but will preferably be a phenolic resin. The phenolics will be various phenol-formaldehyde resins, and may be either the one- or two-stage resins.

The thermoplastic resins may be acrylic, polyolefin, polyvinyl, polystyrene, or the like resins. Preferably the thermoplastic resin will be selected from the group consisting of polyvinyl, polystyrene, and polyolefin thermoplastic resins. The polyvinyl resins will comprise the polyvinyl halides, particularly the polyvinyl chlorides, as well as polyvinyl acetates, polyvinyl alcohols, polyvinyl butyrals, and the polyvinyl formals. Of a somewhat similar nature are the polystyrene resins including such conventional materials as polystyrene itself and "ABS" (acrylonitrile-butadiene-styrene). The polyolefin resins comprise polyethylene, polypropylene, and polybutylene of various densities as well as copolymers thereof. The most preferred resins are the polyvinyl halides (especially polyvinyl chloride: "PVC") and the polyolefins. It is the latter resins which show the greatest detrimental effect of asbestos fiber fillers in conventional circumstances, and consequently, it is with those that the improvement of the present invention is most marked. The invention herein is particularly advantageous for use with the structural foam plastics.

The fibers satisfactory for use in the present invention are the nonamphibole asbestos fibers and other inorganic fibers of similar aspect ratio and fiber diameter. As used herein "nonamphibole" is defined according to the classification system set forth by Dana and Ford, *A Textbook of Mineralogy* (4th Edn., 1932). Table I below lists the six principal materials commonly referred to as "asbestos fiber" as well as their classification in this standard mineralogical system:

TABLE I

| Fiber | Classification |
|---|---|
| Chrysotile | Serpentine |
| Anthophyllite | Anthophyllite |
| Amosite | " |
| Crocidolite | Riebeckite |
| Tremolite | Amphibole |
| Actinolite | " |

It has been found by experimentation that the amphibole asbestos fibers (particularly tremolite) do not show the marked beneficial effects of the glycol treating of this invention, while the other types of asbestos fiber do show such effect. While the reason for this difference in response is not known, it is believed that it may be related to the fact that the amphibole fibers commonly have significantly lower aspect ratios than the other types of fibers. Therefore, the amphibole materials effectively exhibit considerably less fibrous character than do the nonamphibole materials.

Since, as discussed below, the effect observed for the composition of this invention is believed to be a primarily physical effect, fibers other than non-amphibole asbestos may also be used if they exhibit similar aspect ratios and fiber diameters. Such fibers may be versions of potassium titanate fibers or carbon whiskers. Fibers such as glass fibers, on the other hand, are much too coarse to be used satisfactorily.

The preferred fiber herein will be chrysotile asbestos. Various fiber grades or lengths are satisfactory for use herein, although it is common to use the shorter grades 5 to 7 (as graded according to the Quebec Standard Screen Test). The nonamphibole asbestos filler will be present as from 5–85 phr, preferably 5–50 phr. The actual maximum amount of fiber which may be used will vary from resin to resin. It has been found that polybutylene is more amenable to fiber filling than are the other polyolefins or the polyvinyl halides. Particularly good results have been found for polyvinyl chloride and all polyolefins in the range of 5–40 phr. It has also been found that increasing amounts of asbestos fiber may require correspondingly increasing amounts of glycol and/or lubricant. The optimum amount of asbestos fiber and glycol to be used to provide the desired physical properties as well as the desired degree of reinforcement, filling, and resin extension can readily be determined by routine methods.

The glycols suitable for use herein are those glycols or diols which are liquid at temperatures below 50° C. (preferably at ambient temperatures), compatible but chemically unreactive and immiscible with the polymeric resin, preferably miscible with water, and stable and liquid up to and at the temperatures of subsequent plastic processing, such as extruding or molding. Chief among these are ethylene glycol, propylene glycol and those polyethylene glycols having molecular weights not greater than 1500. Of these materials the polyethylene glycols, particularly those having molecular weights not greater than 600, are preferred over the ethylene and propylene glycols because the latter two are both more hygroscopic. The higher molecular weight (greater than 1500) polyethylene glycols are solids (waxes) at temperatures below 50° C. (122° F.) and are not miscible with water at ambient temperatures. These have been found by experimentation to have little effect on improving the impact resistance of an asbestos-filled plastic, although as discussed below the solid polyethylene glycols may find use in this invention as internal lubricants. However, the fact that a particular glycol may have been known previously as an external lubricant for use in plastic processing will have no bearing on whether or not it can be used as a fiber coating in the present invention to provide the improved impact resistance. Many prior art "lubricants" have been found to be entirely ineffective by themselves to provide the impact resistance characteristics of the compositions of this invention in fiber-filled resins. On the other hand, as will be discussed below, many lubricants have been found to be quite effective when used in conjunction with the glycol coated fiber of the present invention to enhance the improvements provided by the glycol treatment.

The invention herein is limited to the use of glycols (diols) because only they possess the required combination of being in the liquid state at generally ambient conditions and not being degraded by typical plastic processing temperatures. Various other polyhydric alcohols, such as many of those mentioned in the aforesaid U.S. Pat. No. 3,180,848, either have melting points greater than 50° C. (122° F.) or have relatively low flash points which prohibit their use during plastics processing.

In a number of cases it may also be desirable to incorporate into the resin mixture containing the glycol precoated fiber an additional component referred to herein as a "lubricant". Typical of such materials are stearic acid, its metal salts, and liquid and/or solid polyethylene glycols. It will be noted that certain of the liquid polyethylene glycols are included as those used to coat the fiber as described above. In addition, an excess of such material can be used as a lubricant to enhance the properties of the fiber previously treated with glycol. In this particular classification, however, the function of the excess glycol is as a lubricant in the mixture and the glycol is the functional equivalent of the stearic acid and salts and the solid waxy glycols. Such materials are not equivalent in the function and use of fiber precoating.

Various factors will affect the selection of the specific lubricant to be used in any given case. For instance, resins as commercially produced often contain additives for coloration, heat stabilization, anti-static coating, ultraviolet stabilization, etc., and the lubricant must be selected so as to be compatible with or at least inert to other additives which may be present.

A description of the physical mechanism believed to be occurring in the composites of the present invention will serve to distinguish between the precoat glycol and the lubricant. The precoat glycol serves to modify the physical bond existing between the fiber surface and the resin, so as to decrease the frictional forces occurring tangential to the fiber/resin interface. Since this effect is a physical surface effect, the beneficial effects of this invention are applicable in practice to those fibers, such as chrysotile asbestos, with high surface areas. The modifying of this bond restores ductility and flexibility to the fiber filled resin, for the tendency of the fiber/resin bond to inhibit movement of the composite is significantly reduced. A lubricant, on the other hand, serves to ease movement of the polymer chains in the resin itself relative to each other. As will be shown below, a lubricant, even a liquid glycol, if merely added in the mixture has only minimal affect on the resin/fiber bond. Thus the various materials described in the aforesaid U.S. Pat. No. 3,180,848 may have some lubricating function, but do not serve the function of the coating for the fibers. In addition, it is known that when used in an unfilled (i.e., no fiber) resin matrix, lubricants often lower both ductility and tensile strength of the resin.

It will thus be seen that the principal facet in the present invention is the precoating of the asbestos fiber with the described liquid glycol. The fiber must be precoated if the superior benefits of the invention described herein are to be obtained. Simple mixing, while producing some degree of improvement in ductility, is far less effective than the precoating of the present invention.

Thus one aspect of the present invention is the precoated asbestos fiber itself. The glycol precoat will be present as 1 to 75 percent by weight, preferably 5 to 50 percent by weight, and most preferably 10 to 30 percent by weight, of the asbestos fiber. The fiber may readily be coated with glycol at one location (e.g., an asbestos mill) and the coated fiber then shipped to another location (e.g., a plastics plant). Utility of the invention is thus maximized.

In a preferred aspect of the invention, superior flexural properties can be obtained by a fiber-coating treatment in which the glycol is diluted with water and the aqueous solution used to saturate the fiber, or the glycol alone may be coated onto the fiber by high intensity mixing. This assures that the fiber is completely coated with the glycol prior to incorporation into the resin. Typical of the coating mixers suitable for use in this process are those commercial mixers known by the trade names of "Hurricane Pulverizer" and "Raymond Vertical Mill".

Considering the fiber-glycol-resin system as a whole, the glycol in the form of fiber coating will as noted be present in the system as 1 to 75 percent, preferably 5–50 or 10–30 percent, of the asbestos fiber. This corresponds to approximately 0.25 to 42.5 phr, preferably 0.25 to 25 phr. Greater amounts of glycol are not found to add significantly to the amount of impact improvement obtained and smaller amounts are generally insufficient to thoroughly coat the fibers. It will usually be found with most resins that the higher concentrations of fiber in the resin may require correspondingly higher concentrations of glycol for satisfactory coating and impact resistance. Fiber surface area, openness of the fiber bundles, and type of resin will also be factors in the optimum amount of glycol to be used in any given instance. Mixing of the coated fiber and resin can be accomplished by conventional high-intensity mixing devices. Such devices can also be used for the premixing of the fiber and glycol. Those skilled in the art will be aware of the conventional operating parameters such as speed of mixing, length of mixing time and the like. As noted, the fiber and water-miscible glycol can be dispersed in a quantity of water to improving fiber coating.

The wet, coated fiber is then dried prior to incorporation into the resin.

The incorporation of the internal lubricant into the composite of resin and coated fiber is dependent upon the concentration of fiber present, the type of resin into which the fiber is incorporated, the fiber type (and grade if asbestos), and the ductility of the molded product. It has been found that with various resins the amount of ductility improvement obtained reaches a maximum at a certain degree of fiber incorporation. Thereafter, incorporation of additional fiber tends to reduce ductility. The point of maximum ductility occurs at different fiber concentrations with different resins. With high density polyethylene, for instance, maximum ductility improvement is obtained at approximately 5% fiber incorporation, and additional fiber incorporation, as for instance up to 10%, has a detrimental affect on ductility. With other resins the maximum ductility point is usually found at higher levels of fiber loading. In each case, however, it is beneficial and desirable to incorporate the external lubricant into the resin matrix when it is desired to have a higher fiber loading than that at which maximum ductility is obtained. The use of this internal lubricant enhances the effect of the glycol and allows additional coated fiber to be incorporated into the resin matrix without suffering the degree of ductility loss which would otherwise occur. The amount of lubricant to be added will normally be on the order of 1 to 15% by weight of asbestos fiber or some 0.5 to 20 phr based on resin. The exact amount to be added and the determination of when addition of lubricant would be beneficial will be dependent upon the various factors described above, all of which will be well known to those skilled in the art. In addition, it is believed that the type of mixing used to mix resin, coated fiber and lubricant will also affect the optimum amount of lubricant used, with less lubricant being needed when the mixing is more efficient. Normally, it will be found easiest simply to measure ductility of various samples of the particular resin under investigation at different fiber loadings and to add lubricant in an amount sufficient to restore ductility when measurements at the higher fiber loadings indicate that ductility is being decreased. In fact, the measurement of ductility is the best basis for determining when and how much lubricant should be used regardless of the other additives which may be present or what type of compounding or mixing has been used.

Following mixing of the coated fiber and resin (and lubricant, if desired), the plastic mixture can be formed into a variety of different articles by conventional techniques such as extrusion and molding. Of particular interest is extruded pipe, such as that known as "filled PVC pipe". Such pipes find extensive use as water supply and waste disposal conduits.

It is in the utilization of the present composition as pipe that the superior impact resistance can be particularly noted. Conventional pipes are subject to a great deal of stress and abuse both during handling and implacement in the field and subsequent burial and retention underground. The pipes must be able to resist the impacts caused by heavy construction equipment passing over filled pipe trenches, stacked pipes being hit by other pipes and various types of equipment, and the not infrequent accidents in which workmen digging in the area of buried pipe inadvertently dig into a pipe. Table II below illustrates the significant improvement obtained by the composition of this invention over unfilled and asbestos fiber-filler polyvinyl chloride pipe. The test pipe was 1" (2,5 cm) nominal diameter PVC pipe formed in a Brabender single screw extruder at 100 rpm screw feed and a die temperature of 195° C. (383° F.). The fiber additive was grade 7RF chrysotile fiber at a concentration of 10 phr. Impact strength was measured by a series of impacts on the surface of a 1" (2,5 cm) nominal extruded PVC pipe with a pick tip weighted with a 20 lb. (9.1 kg) weight.

TABLE II

| Composition* | Impact Strength, ft-lb | N-m |
|---|---|---|
| Unfilled PVC | 6.5 | 8.8 |
| PVC filled with untreated fiber | 3.0 | 4.1 |
| PVC filled with asbestos fiber coated with 5% PEG | 7.5 | 10.2 |

*"PVC" = rigid polyvinyl chloride
"PEG" = 200 M.W. polyethylene glycol

It will be seen from the above table that conventional unfilled PVC has relatively good impact strength. Filling the PVC with asbestos fiber is seen to be quite detrimental, for the impact strength is reduced by more than half. When the composition incorporates the polyethylene glycol, as fiber coating however, strength is significantly improved, to the extent that the PVC containing glycol-coated fiber is stronger than the initial unfilled PVC.

Table III below illustrates generally the improvement of the present invention. In the experiments shown in Table III, the resin matrix was polyvinyl chloride, the fiber was 7RF chrysotile asbestos and the glycol was 200 molecular weight polyethylene glycol.

TABLE III

| Run | Fiber Content, phr | Glycol Content, phr or % | Fiber Precoating* | ASTM D-256 Unnotched Izod Impact, ft-lb/in | N-m/m | ASTM D-790 Flexural Stiffness lb/in² × 10⁻⁵ | g/cm² × 10⁻⁷ |
|---|---|---|---|---|---|---|---|
| 1 | none | none | — | 20 | 1068 | 4.4 | 3.1 |
| 2 | 20 | none | — | 6 | 320 | 5.8 | 4.1 |
| 3 | 10 | none | — | 12 | 641 | 5.6 | 3.9 |
| 4 | none | 15 phr | (4) | 35 | 1868 | 2.3 | 1.6 |
| 5 | 30 | 15 phr | (4) | 10 | 534 | 3.4 | 2.4 |
| 6 | 20 | 15 phr | (1) | 10 | 534 | 3.4 | 2.4 |
| 7 | 20 | 15 phr | (2) | 30 | 1601 | 3.4 | 2.4 |
| 8 | 20 | 10 phr | (2) | 22 | 1174 | 4.4 | 3.1 |
| 9 | 20 | 5 phr | (2) | 14 | 747 | 5.6 | 3.9 |
| 10 | 10 | 5% | (3) | 33 | 1762 | 5.7 | 4.0 |
| 11 | 10 | 10% | (3) | 34 | 1815 | 6.0 | 4.2 |

TABLE III-continued

| Run | Fiber Content, phr | Glycol Content, phr or % | Fiber Precoating* | ASTM D-256 Unnotched Izod Impact, ft-lb/in | | ASTM D-790 Flexural Stiffness | |
|---|---|---|---|---|---|---|---|
| | | | | ft-lb/in | N-m/m | lb/in² × 10⁻⁵ | g/cm² × 10⁻⁷ |
| 12 | 30 | 5 phr | (2) | 10 | 534 | 5.3 | 3.7 |

*(1) Glycol and resin were first mixed in a Brabender mixer at 200° C. (392° F.) and the fiber thereafter added.
(2) Fiber and glycol were premixed for one minute in a high-speed Waring blender and thereafter compounded with the resin in a Brabender mixer at 200° C. (392° F.).
(3) The fiber was coated with glycol by saturation from a water solution, dried at 121° C. (250° F.), and then compounded with the resin in a Brabender mixer at 200° C. (392° F.).
(4) No precoating of fiber; glycol just mixed into resin matrix.

Runs 1 through 4 are control runs intended to illustrate that neither asbestos fiber alone nor glycol alone, when simply mixed with resin, produces a material which approaches the physical properties of the unfilled resin. The use of untreated fiber drastically reduces the impact strength although substantially stiffening the material. The glycol alone, on the other hand, yields a high impact material but one with very little flexural stiffness. In other words, the untreated fiber alone produces a stiff, brittle material while the glycol additive alone (without fiber) produces a material with good impact strength but which seriously lacks stiffness. Run 5 illustrates the use of a glycol in the function of a "lubricant" where it is merely mixed into the entire resin matrix. The sample remains as brittle as when no glycol is present and flexural stiffness is low. Run 6 illustrates a simple premixing in which very little fiber coating occurs; the glycol and fiber are simply milled together for a short time prior to addition of the resin into the mixture. This is essentially no different than using the glycol as a lubricant for impact strength and flexural stiffness remain relatively low. In contrast, however, the experiments labeled 7 through 12 show significant improvement in the compositions of the present invention in which the fiber is thoroughly permised with glycol. Even a small amount of glycol, suitably coating the fibers, more than doubles the impact strength of PVC containing untreated fiber and increasing amounts of glycol bring the impact strength equal to or considerably better than that of initial unfilled PVC.

Table IV below illustrates that the improvement of this invention is obtained with a variety of different glycols, all of which have the glycol properties stated above. The control sample was once again unfilled polyvinyl chloride. All other samples were PVC filled with 7RF chrysotile fiber at a concentration of 10 phr. Glycol fiber treatment was 5% based on fiber weight. Impact strength was measured by the above-mentioned "pick tip" test. The highest and lowest values are shown along with the average impact force. It will immediately be apparent that the glycol-treated fiber provides a material having impact strength equal to or greater than that of the unfilled PVC while the strength of the PVC filled with untreated asbestos fiber is substantially inferior.

TABLE IV

| | Impact Strength, ft-lb (or N-m) | | |
|---|---|---|---|
| Type of Glycol | High | Low | Average |
| control (unfilled) | 6.5(8.8) | 5(6.8) | 6(8.1) |
| none (untreated fiber) | 3.5(4.7) | 2(2.7) | 2.5(3.4) |
| 200 m.w. PEG | 9(12) | 6(8.1) | 7.5(10) |
| ethylene | 8(11) | 5(7.8) | 6.5(8.8) |
| propylene | 6(8.1) | 4(5.4) | 5(6.8) |

The improvement of this invention is also illustrated for PVC in the single FIGURE of the drawing. Use of glycol-treated asbestos reduces the maximum energy required to incorporate the fiber into the matrix (i.e., the maximum peak of each curve). It also produces a lower melt viscosity of the resin product (i.e., the vertical height of the right-hand end of each curve). In addition, the amount of stabilizer required for PVC is substantially reduced (i.e., the vertical distance between corresponding points on Curves B and C).

The process of this invention is also highly beneficial in the case of precompounding of coated fiber and resin, also known as "masterbatching". In precompounding a relatively small amount of resin is mixed with a large concentration of coated fiber. This concentrated mixture is later diluted with unfilled resin to the final desired composition. Precompounding has been found to improve the glycol coating effect as compared with non-precompounded material, as illustrated below in Table V, probably (it is believed) because the precompounding improves dispersion of fiber and lubricant. The fiber used was 7RF chrysotile fiber, coated where noted with 200 N.W. polyethylene glycol at 10% of fiber weight. The lubricant was stearic acid at 5% of fiber weight. Precompounding consisted of forming a concentrate of 60% fiber in medium density polyethylene and subsequently diluting it with resin to the normal compounding level of concentration of the fiber in resin.

TABLE V

| Run | Glycol Coating | Lubricant | Compounding* | Izod Unnotched Impact Strength | | Flexural Stiffness | Flexural Modulus | Flexural Strength | |
|---|---|---|---|---|---|---|---|---|---|
| | | | | ft./lb/in | N-m/m | lb/in² × 10⁻⁵ | g/cm² × 10⁻⁷ | lb/in² × 10⁻³ | g/cm² × 10⁻⁵ |
| 1 | no | no | N | 1.5 | 80 | 0.73 | 0.51 | 2.75 | 1.93 |
| 2 | no | yes | PC | 1.0 | 53 | 1.42 | 1.00 | 2.98 | 2.09 |
| 3 | yes | no | N | 1.5 | 80 | 0.72 | 0.52 | 2.48 | 1.74 |
| 4 | yes | no | PC | 2.1 | 112 | 0.97 | 0.68 | 3.28 | 2.31 |
| 5 | yes | yes | N | 1.9 | 85 | 1.10 | 0.77 | 3.51 | 2.47 |
| 6 | yes | yes | PC | 1.9 | 101 | 1.11 | 0.78 | 2.64 | 1.86 |

*"N" = Normal compounding (30% fiber concentration)
"PC" = Precompounding (60% fiber concentration diluted to 30%)

Table VI below illustrates the improvement of the present invention where the resin matrix is a polyolefin. While the improvement with these materials is not as dramatic as that with the PVC, use of the glycol substantially improves the impact strength of the material over that of samples using untreated asbestos, in some cases doubling the strength. The ductility is also improved to the point where a ⅛" flat sheet can be bent 180° (into a U-shape) without cracking. Thus, while the glycol and asbestos-filled material does not equal in impact strength the original unfilled polyolefin, the use of glycol according to the improvement of this invention renders the filled material considerably superior to that filled material previously available and therefore acceptable in many applications where unfilled resin is not available and where asbestos-filled resin has previously been too weak for use.

Flexural stiffness in a fiber-containing composite is known to be a direct function of the degree of fiber dispersion. The data of Table VI clearly indicates that the glycol treating substantially improves the dispersion of the asbestos fiber in the resin matrix. Comparison of the flexural strength of the composite filled with untreated asbestos fiber with the flexural strength of the unfilled resin shows some improvement. However, substantially greater improvement is obtained by glycol-treating the same amount of fiber, which is the result of the better fiber dispersion promoted by the glycol treatment.

precoated with 5% of 200 molecular weight polyethylene glycol. All runs also included standard commercial PVC processing aids.

TABLE VII

| Sample | Izod Impact Strength, ft-lb/in (or N-m/m) | |
|---|---|---|
| | Notched* | Unnotched |
| Control (unfilled PVC) | 0.8 (43) | 24 (1280) |
| Sample A | 0.7 (37) | 28 (1490) |
| B | 0.75 (40) | 27 (1440) |
| C | 0.8 (43) | 29 (1550) |

*average of two runs

Table VIII below illustrates the use of lubricants and shows some of the variables which determine whether or not a lubricant can be used to advantage. In each case, the resin was polyethylene; in Runs 1–9 the resin was a commercial low melt index extension grade high density polyethylene ("HDPE") and in Runs 10–12 the resin was a commercial medium density polyethylene ("MDPE"). These materials contained normal commercial additives such as extrusion aids, antioxidants and colorants. The fiber used was 7RF chrysotile asbestos fiber. The fiber treatment was a 10% by weight fiber of coating with 200 molecular weight polyethylene glycol; and a lubricant was added as 5% fiber weight. The

TABLE VI

| Resin | Filler | | Impact (notched) | | Flexural Stiffness | |
|---|---|---|---|---|---|---|
| | Asbestos*, phr | Glycol, % fiber wt. | ft-lb/in | N-m/m | lb/in$^2$ × 10$^{-5}$ | g/cm$^2$ × 10$^{-6}$ |
| polyethylene foam (0.7gm/cc) | none | none | 3.6 | 192 | 1.10 | 7.7 |
| " | 20 (a) | none | 1.1 | 59 | 1.40 | 9.8 |
| " | 20 (a) | 5 | 2.1 | 112 | 2.70 | 19.0 |
| polybutylene (c) | none | none | 8.1 | 432 | 0.38 | 2.7 |
| " | 30 (b) | none | 1.8 | 96 | 0.71 | 5.0 |
| " | 30 (b) | 5 | 4.0 | 214 | 1.05 | 7.4 |

*(a) Johns-Manville "PAPERBESTOS No. 5" asbestos fiber: approximately 95% minus 10 mesh; 2.2 m$^2$/g surface area
(b) Johns-Manville asbestos fiber, grade 7RF: approximately 0.5% minus 28 mesh
(c) Contained carbon black Table VII below illustrates a comparison of filled PVC using conventional compounding additives with a commercial unfilled PVC sample representative of typical extruded PVC pipe presently available on the market. The control sample was a heat-flattened section of extruded 6" (15.2 cm) PVC pipe taken from the production of a typical PVC pipe plant. Samples A, B, and C represent typical examples of the PVC composition containing glycol-coated fiber according to the process of this invention extruded on the same commercial extruder as the control sample and similarly heat-flattened. The test samples A, B, and C each contained 10 phr of 7RF chrysotile asbestos fiber which had been flexural ductility was a test in which a elongated strip of the plastic composite was bent 180° (into a U-shape) until the opposite ends touched. Rating was on a scale of 1 to 4, where 1 indicates a brittle material and 2 represents a material which still has a significant degree of brittleness but is less brittle than materials rated 1. The designations 3 and 4 indicate material which is sufficiently flexible to be readily bent into the U-shape, with those designated 4 bending more easily than those designated 3. Ratings of 3 and 4 are considered to be satisfactory.

TABLE VIII

| Sample | | Resin | Fiber | Fiber Treatment | Lubricant* | Izod Impact Strength ft.-lb/in (or N-m/m) | | | | Flexural Ductility |
|---|---|---|---|---|---|---|---|---|---|---|
| | | | | | | Notched | | Unnotched | | |
| 1 | (Control) | HDPE | No | No | No | 3.2 | (171) | 3.4 | (181) | 4 |
| 2 | | HDPE | No | No | S.A. | 2.0 | (107) | 18 | (960) | 4 |
| 3 | | HDPE | Yes | No | No | 1.0 | (54) | 3.6 | (192) | 1 |
| 4 | | HDPE | Yes | No | S.A. | 1.2 | (64) | 3.3 | (172) | 2 |
| 5 | | HDPE | Yes | Yes | No | 1.0 | (54) | 4.5 | (240) | 3 |
| 6 | | HDPE | Yes | Yes | S.A. | 0.9 | (48) | 5.0 | (267) | 4 |
| 7 | | HDPE | Yes | Yes | S.A. | 1.0 | (54) | 4.7 | (251) | 4 |
| 8 | | HDPE | Yes | Yes | PEG-1000 | 1.3 | (69) | 6.4 | (342) | 4 |
| 9 | | HDPE | Yes | Yes | PEG-200 | 1.3 | (69) | 5.2 | (278) | 3 |
| 10 | (Control) | HDPE/MDPE blend | No | No | | 1.8 | (96) | 13.8 | (737) | 4 |
| 11 | | HDPE/MDPE blend | Yes | Yes | | 1.4 | (75) | 9.5 | (507) | 4 |

TABLE VIII-continued

| Sample | Resin | Fiber | Fiber Treatment | Lubricant* | Izod Impact Strength ft.-lb/in (or N·m/m) Notched | Unnotched | Flexural Ductility |
|---|---|---|---|---|---|---|---|
| 12 | HDPE/MDPE blend | Yes | Yes | | 1.7 (91) | 11.1 (593) | 4 |

*S.A. = Stearic acid
PEG-1000 = 1000 MW polyethylene glycol (solid)
PEG-200 = 200 MW polyethylene glycol (liquid)

It will be evident from the above that the use of lubricants varies with the type of plastic material being considered. In the high density polyethylene a 30% loading of untreated fiber makes the sample completely unsatisfactory (rating 1). Addition of a lubricant somewhat improves the untreated fiber but still is not a satisfactory material (rating 2). The use of treated fiber makes the reinforced material satisfactory although not optimum (rating 3). Addition of lubricant, however, in the form of a stearic acid or solid polyethylene glycol makes the material quite satisfactory in combination with the treated fiber (rating 4). Use of a liquid polyethylene glycol also provides a satisfactory material (rating 3), but not as good as one with the solid lubricants. It is believed that this would be because the liquid glycol is not as efficient a lubricant as the solid materials.

On the other hand, the medium density polyethylene reinforced with coated fiber provides a satisfactory material (rating 4), regardless of whether the lubricant is used or not. This is because the medium density material does not lose its ductility at as low a concentration as does the high density alone. Thus, while the lubricant provides somewhat greater impact strength in the medium density material, it is not the necessity that it is in the high density material at the loading of 30% fiber. Therefore, as noted above, ductility must be observed for each different type of sample to determine whether or not a lubricant can be beneficially used.

Table IX below illustrates the use of a metal salt of stearic acid as a lubricant. It also indicates that different lubricants may not function equally in the various resins, as mentioned above. Therefore again, ductility measurements should be the guide to lubricant selection. In the tests reported in Table IX the resin was a commercial injection molding grade of polypropylene containing precompounded stabilizing and processing additives. The fiber was chrysotile asbestos, grade 7RF. Fiber treating was by coating with polyethylene glycol (M.W.=200) to a level of 10% fiber weight. The lubricant was present as 5% fiber weight. Flexural ductility is rated on a scale of 1–4 as described above.

TABLE IX

| Run | Fiber | Glycol | Lubricant* | Component Dispersion | Flexural Ductility |
|---|---|---|---|---|---|
| 1 | no | no | no | — | 3 |
| 2 | yes | no | no | good | 1 |
| 3 | yes | yes | no | poor | 1–2 |
| 4 | yes | no | S.A. | fair to good | 2 |
| 5 | yes | yes | S.A. | good | 2–3 |
| 6 | yes | yes | CaSt | good | 3 |

*S.A. = stearic acid
CaSt = calcium stearate

Table X below illustrates the affect of lubricants and impact modifiers on the reinforced resin matrix. The resin was rigid PVC and the fiber was chrysotile asbestos fiber, grade 7RF, at a level of 20 phr. Fiber treating was with 200 molecular weight polyethylene glycol to a concentration of 10% fiber weight. The impact modifier was present in a concentration of 5 phr and the lubricant as 5% fiber weight.

TABLE X

| Run | Fiber | Glycol | Impact Modifier(a) | Lubricant(b) | Flexural Stiffness lb/in² × 10⁻⁵ | g/cm² × 10⁻⁷ | Flexural Ductility | Izod Impact Strength Notched ft-lb/in | N·m/m | Unnotched ft-lb/in | N·m/m |
|---|---|---|---|---|---|---|---|---|---|---|---|
| 1 | no | no | no | no | 4.0 | 2.8 | 4 | 1.1 | 59 | 20 | 1068 |
| 2 | yes | yes | no | no | 4.6 | 3.2 | 1.2 | 0.7 | 37 | 13 | 694 |
| 3 | yes | yes | PS | no | 4.5 | 3.1 | 1 | 0.8 | 43 | 7 | 374 |
| 4 | yes | yes | CPE | no | 4.8 | 3.4 | 2 | 1.0 | 54 | 9 | 480 |
| 5 | yes | yes | No | glycol | 4.7 | 3.3 | 3 | 1.0 | 54 | 19 | 1014 |
| 6 | yes | yes | CPE | glycol | 4.2 | 2.9 | 4 | 1.1 | 5.9 | 20 | 1068 |

(a)PS = high impact polystyrene
CPE = chlorinated polyethylene
(b)"glycol" was excess 200 M.W. polyethylene glycol It will be seen from Table X that while treated fiber alone is much better than the treated fiber with impact modifiers, the addition of the lubricant has the effect of providing a reinforced plastic with properties equal to that of the unfilled resin.

The invention herein has been illustrated above primarily with thermoplastic versions. It is, however, equally applicable to filled thermosetting resins. The data of Table XI below illustrates the effect of the glycol coating of chrysotile asbestos fiber with phenolic resin. Glycol coating was at a level of 10% of fiber weight; no lubricant was present, and fiber concentration was 20%.

TABLE XI

| Run | Density g/cm³ | Izod Unnotched Impact Strength ft-lb/in | N·m/m | Flexural Stiffness Modulus lb/m² × 10⁻⁵ | g/cm² × 10⁻⁷ | Flexural Strength lb/in² $^l$ × 10⁻³ | g/cm² $^l$ × 10⁻⁵ |
|---|---|---|---|---|---|---|---|
| control (unfilled) | 1.195 | 0.36 | 19 | 4.35 | 3.06 | 3.57 | 2.51 |
| filled with | | | | | | | |

TABLE XI-continued

| Run | Density g/cm$^3$ | Izod Unnotched Impact Strength | | Flexural Stiffness Modulus | | Flexural Strength | |
|---|---|---|---|---|---|---|---|
| | | ft-lb/in | N-m/m | lb/m$^2$ × 10$^{-5}$ | g/cm$^2$ × 10$^{-7}$ | lb/in$^2$ × 10$^{-3}$ | g/cm$^2$ × 10$^{-5}$ |
| coated fiber | 1.153 | 0.65 | 35 | 5.20 | 2.95 | 4.16 | 2.92 |

What I claim is:

1. A plastic composite composition having both good internal reinforcement and impact strength, which comprises:
   (a) a polymeric resin matrix, said resin being selected from the group consisting of acrylic, polyolefin, polyvinyl and polystyrene thermoplastic resins and phenolic, epoxy, polyurethane and silicone thermosetting resins;
   (b) nonamphibole asbestos reinforcing fiber in a concentration of 5 to 85 phr; and
   (c) coated on said fiber a glycol in a concentration of 1 to 75 percent by weight based on fiber, said glycol being stable and liquid up to and at the processing temperature of said resin, compatible but chemically unreactive and immiscible with said resin, of low hygroscopicity, and liquid at temperatures of less than 50° C., wherein said fiber is coated with said glycol prior to admixture thereof with said resin matrix.

2. The composition of claim 1 wherein said glycol is selected from the group consisting of ethylene glycol, propylene glycol, and those polyethylene glycols having molecular weights not greater than 1500.

3. The composition of claim 2 wherein said glycol is present in a concentration of 5 to 50 percent.

4. The composition of claim 1 wherein said fiber is present as 5 to 50 phr.

5. The composition of claim 1 wherein said glycol is a polyethylene glycol having a molecular weight not greater than 600.

6. The composition of claim 1 wherein said polymeric resin matrix is selected from the group consisting of said acrylic, polyolefin, polyvinyl and polystyrene thermoplastic resins.

7. The composition of claim 6 wherein said resin is a polyvinyl or polyolefin resin.

8. The composition of claim 7 wherein said resin is a polyvinyl resin.

9. The composition of claim 8 wherein said resin is a polyvinyl halide resin.

10. The composition of claim 9 wherein said polyvinyl halide resin is polyvinyl chloride.

11. The composition of claim 10 wherein said glycol is a polyethylene glycol having a molecular weight not greater than 600.

12. The composition of claim 7 wherein said resin is a polyolefin resin.

13. The composition of claim 12 wherein said polyolefin resin is polyethylene.

14. The composition of claim 12 wherein said polyolefin resin is polybutylene.

15. The composition of claim 12 wherein said glycol is a polyethylene glycol having a molecular weight not greater than 600.

16. The composition of claim 1 wherein said polymeric resin matrix is selected from the group consisting of said phenolic, epoxy, polyurethane and silicone thermosetting resins.

17. The composition of claim 16 wherein said resin is a phenolic resin.

18. The composition of claim 1 further comprising lubricant for said polymeric resin matrix.

19. The composition of claim 18 wherein said lubricant is selected from the group consisting of stearic acid, metal salts of stearic acid and polyethylene glycol.

20. A process for the formation of plastic composite articles having both good internal reinforcement and impact strength, which comprises:
   (a) coating a nonamphibole asbestos fiber with a glycol selected from the group consisting of ethylene glycol, propylene glycol, and those polyethylene glycols having molecular weights not greater than 1500, said glycol being present as 1 to 75 percent by weight of said fiber, and
   (b) thereafter mixing the coated fiber with a polymeric resin in an amount such that said coated fiber is present as 5 to 85 phr and subsequently molding said composition into a shaped article.

21. The process of claim 20 wherein said coating of said fiber comprises high-intensity mixing of said fiber and said glycol.

22. The process of claim 20 wherein said coating of said fiber comprises saturating the fiber from a water solution of said glycol.

23. The process of claim 20 wherein said glycol is present on said fiber as 5 to 50 percent by weight of fiber weight.

24. The process of claim 20 wherein said coated fiber is present as 5 to 50 phr.

25. The process of claim 20 further comprising also incorporating into said mixture of resin and coated fiber a lubricant for said resin.

26. The process of claim 25 wherein said lubricant is selected from the group consisting of stearic acid, metal salts of stearic acid and polyethylene glycol.

27. A shaped composite article having both good internal reinforcement and impact strength, which comprises a pipe formed according to the process of claim 20.

28. Nonamphibole asbestos fiber coated with a glycol selected from the group consisting of ethylene glycol, propylene glycol, and those polyethylene glycols having molecular weights not greater than 1500, said glycol being present in a concentration of 1 to 75 percent by weight based on fiber, wherein complete coating of said asbestos fiber is assured by saturation of the asbestos fiber with a solution of glycol diluted with water or by coating the asbestos fiber with glycol alone by means of high intensity mixing.

29. The coated asbestos fiber of claim 28 wherein said glycol is present as 5 to 50 weight percent of fiber weight.

30. The coated asbestos fiber of claim 28 wherein said glycol is a polyethylene glycol having a molecular weight not greater than 600.

* * * * *

UNITED STATES PATENT AND TRADEMARK OFFICE
CERTIFICATE OF CORRECTION

PATENT NO. : 4,186,123
DATED : January 29, 1980
INVENTOR(S) : John H. Kietzman

It is certified that error appears in the above-identified patent and that said Letters Patent are hereby corrected as shown below:

Column 3, line 15, "abreviated" should be --abbreviated--

Column 3, line 31, "compositon" should be --composition--

Column 9, line 37, "permised" should be --premixed--

Column 12, line 42, "a" second occurrence should be

-- an --.

UNITED STATES PATENT AND TRADEMARK OFFICE
CERTIFICATE OF CORRECTION

PATENT NO. : 4,186,123　　　　　　　　　　Page 2 of 2
DATED : January 29, 1980
INVENTOR(S) : John H. Kietzman It is certified that error appears in the above-identified patent and that said Letters Patent are hereby corrected as shown below:

Column 8, line 18, "2,5" should be --2.5--

Column 8, line 23, "2,5" should be --2.5--

Columns 11 and 12, Table VIII, Sample 2 from "Fiber Treatment" should be shifted to the right Columns 13 and 14, Table XI, under "Flexural Strength" omit the "1" after 2 (squared)

Signed and Sealed this

Fifteenth Day of July 1980

[SEAL]

Attest:

SIDNEY A. DIAMOND

Attesting Officer　　　　Commissioner of Patents and Trademarks